US008618207B2

(12) United States Patent
Sultan et al.

(10) Patent No.: US 8,618,207 B2
(45) Date of Patent: Dec. 31, 2013

(54) FLAME RETARDANT POLYMER COMPOSITION WITH IMPROVED MECHANICAL PROPERTIES

(75) Inventors: Bernt-Ake Sultan, Stenungsund (SE); Wendy Loyens, Stenungsund (SE)

(73) Assignee: Borealis AG, Vienna (AT)

( * ) Notice: Subject to any disclaimer, the term of this patent is extended or adjusted under 35 U.S.C. 154(b) by 226 days.

(21) Appl. No.: 13/141,678

(22) PCT Filed: Nov. 26, 2009

(86) PCT No.: PCT/EP2009/008444
§ 371 (c)(1), (2), (4) Date: Jun. 22, 2011

(87) PCT Pub. No.: WO2010/072303
PCT Pub. Date: Jul. 1, 2010

(65) Prior Publication Data

US 2011/0253420 A1 Oct. 20, 2011

(30) Foreign Application Priority Data

Dec. 22, 2008 (EP) .................................... 08022280

(51) Int. Cl.
*C08K 3/04* (2006.01)
*C08K 3/26* (2006.01)

(52) U.S. Cl.
USPC .......................................... 524/495; 524/472

(58) Field of Classification Search
USPC .......................................................... 524/495
See application file for complete search history.

(56) References Cited

U.S. PATENT DOCUMENTS 5,889,087 A 3/1999 Hayashi et al.
6,020,411 A 2/2000 Hayashi et al.
6,414,059 B1 7/2002 Kobayashi et al.
6,797,886 B1 * 9/2004 Gustafsson et al. ...... 174/110 R
2007/0010615 A1 * 1/2007 Cogen et al. .................. 524/515
2010/0101822 A1 * 4/2010 Bunker et al. .......... 174/110 SR

FOREIGN PATENT DOCUMENTS

EP 0393959 A2 10/1990
EP 1862496 A1 5/2007
WO 98/12253 A1 3/1998
WO 2008/112393 A1 9/2008

OTHER PUBLICATIONS

International Search Report for International Application No. PCT/EP2009/008444.
Written Opinion of the International Searching Authority for International Application No. PCT/EP2009/008444.

* cited by examiner

*Primary Examiner* — Hui Chin
(74) *Attorney, Agent, or Firm* — Roberts Mlotkowski Safran & Cole, P.C.

(57) ABSTRACT

A flame retardant polymer composition comprising (A) an ethylene copolymer comprising polar comonomer units, (B) a silicone-group containing compound, (C) an inorganic filler material, and (D) an ethylene homopolymer or a copolymer of ethylene with one or more other alpha-olefin comonomer units, wherein the polymer composition has a melting enthalpy of at least 78 J/g, an article, in particular a wire or cable, comprising said composition and the use of an ethylene homo- or copolymer in a flame retardant layer of a wire or cable for improving the mechanical properties of the wire or cable.

16 Claims, No Drawings

FLAME RETARDANT POLYMER COMPOSITION WITH IMPROVED MECHANICAL PROPERTIES

The present invention relates to a flame retardant polymer composition with improved mechanical properties, to an article, in particular a wire or cable, comprising said flame retardant polymer composition and the use of an ethylene homo- or copolymer for improving the mechanical properties of the flame retardant composition.

For improving the flame retardancy of polymers, several approaches are known in the art. First, it is known to include compounds containing halides into the polymer. However, these materials have the disadvantage that by burning hazardous and corrosives gases like hydrogen halides are deliberated. This is also a disadvantage of flame retardant polymer compositions based on PVC.

In a further approach, flame retardant compositions include relatively large amounts, typically 50 to 60 wt. %, of inorganic fillers such as e.g. hydrated and hydroxy compounds, which during burning decompose endothermically and liberate inert gases at temperatures in the range of 200 to 600° C. Such inorganic fillers e.g. include $Al(OH)_3$ and $Mg(OH)_2$. However, these flame retardant materials suffer from the high costs of the inorganic fillers and the deterioration of the processability and mechanical properties of the polymer composition due to the high amount of filler.

A third approach as disclosed in EP 0 393 959 uses a silicon fluid or gum in a composition together with an organic polymer comprising an ethylene acrylate or acetate copolymer, and an inorganic filler.

The latter compositions have been improved on behalf of processability and surface smoothness in EP 1 862 496 by including a polypropylene component into the composition.

Although such compositions have good flame retardant properties, the mechanical properties of the composition may still be improved for fulfilling the more stringent mechanical requirements especially for power cables.

It is thus object of the present invention to avoid the disadvantages of the prior art materials and to provide a flame retardant polymer composition which shows a combination of good flame retardancy, in particular good performance in the single wire burning test according to IEC 332-1 and good mechanical properties, particularly tensile properties, tear resistance and high temperature pressure resistance.

The present invention is based on the finding that the mechanical properties of a polymer composition comprising an ethylene copolymer comprising polar comonomer units, a silicone group containing compound and an inorganic filler material can be improved by the addition of a ethylene homo- or copolymer so that the melting enthalpy of the polymer composition has an amount of at least 78 J/g.

The invention therefore provides a flame retardant polymer composition comprising (A) an ethylene copolymer comprising polar comonomer units, (B) a silicone-group containing compound, (C) an inorganic filler material, and (D) an ethylene homopolymer or a copolymer of ethylene with one or more other alpha-olefin comonomer units, wherein the polymer composition has a melting enthalpy of at least 78 J/g.

It has surprisingly been found that by addition of an ethylene homo- or copolymer to the inventive polymer composition the melting enthalpy of the composition is increased to an amount of at least 78 J/g, The polymer composition preferably has a melting enthalpy of at least 80 J/g, most preferably at least 82 J/g.

It is preferred that the upper limit of the melting enthalpy of the inventive polymer composition is not higher than 150 J/g.

The composition of the invention further shows improved mechanical properties as can be seen in improved tensile properties like tensile strength and elongation at break, improved tear resistance and a low indentation in the high temperature pressure test. At the same time the composition shows good flame retardancy, like in the single wire burning test according to IEC 332-1.

Preferably, the composition is free of halogen- and phosphorous-containing compounds as flame retardancy aids, i.e. such compounds, if at all, are present in the composition in an amount of below 3000 ppm.

More preferably, the composition is entirely free of halogen-containing compounds. However, especially phosphorous containing-compounds may be present in the composition as stabilizers, usually in an amount of below 2000 ppm, more preferably below 1000 ppm.

In the composition, components (A) to (D) may either consist of a single chemical compound or a mixture of compounds of the required type.

The melting enthalpy and the melting temperature are determined during the second melting of the composition by the DSC method as described in the measurement methods section.

It is preferred that the polymer composition of the invention have a primary melting temperature of at least 115° C., more preferably of at least 120° C., most preferably of at least 125° C.

The upper limit of the melting temperature is preferably 150° C., more preferably 140° C.

It has been found that by increasing the amount of ethylene homo- or copolymer (D) in the polymer composition the melting temperature of the composition increases.

Preferably, the amount of ethylene homo- or copolymer (D) is 10 wt % or more, more preferably is 15 wt % or more, still more preferably is 20 wt % or more, and most preferably is 25 wt % or more of the total composition.

Furthermore, preferably the amount of ethylene homo- or copolymer (D) is 50 wt % or less, more preferably is 48 wt % or less, still more preferably is 45 wt % or less, and most preferably is 42 wt % or less of the total composition.

Still further, ethylene homo- or copolymer (D) preferably has a $MFR_2$ measured according to ISO 1133 at 190° C. and 2.16 kg of 0.1 to 15 g/10 min, more preferably of 0.2 to 10 g/10 min, most preferably of 0.3 to 5 g/10 min.

Additionally, ethylene homo- or copolymer (D) preferably has a $MFR_5$ measured according to ISO 1133 at 190° C. and 5 kg of 0.4 to 60 g/10 min, more preferably of 1.5 to 20 g/10 min, most preferably of 2.5 to 10 g/10 min and a $MFR_{21}$ measured according to ISO 1133 at 190° C. and 21.6 kg of 5.0 to 100 g/10 min, more preferably of 10 to 75 g/10 min, most preferably of 20 to 60 g/10 min.

It is preferred that ethylene homo- or copolymer (D) has a density, determined according to ISO 1183 of 935 to 965 $kg/m^3$, more preferably of 938 to 962 $kg/m^3$, most preferably of 940 to 960 $kg/m^3$.

Ethylene homo- or copolymer (D) may consist of a single ethylene homo- or copolymer compound or a combination of different ethylene homo- or copolymer compounds. In another preferred embodiment the ethylene homo- or copolymer (D) may also comprise further additives such as carbon black in an amount of up to 5 wt % of ethylene homo- or copolymer (D).

In one preferred embodiment ethylene homo- or copolymer (D) refers to an ethylene homopolymer. However, ethylene homo- or copolymer (D) may also refer to an ethylene copolymer. In the latter case the one or more comonomer units are preferably selected from a group comprising alpha-olefins having three to ten carbon atoms. Especially preferred as comonomers are propene, 1-butene, 1-hexene, 4-methyl-1 pentene, 1-octene and 1-decene. Especially preferred as comonomer units are 1-butene, 1-hexene, 4-methyl-1 pentene and 1-octene. Mostly preferred are 1-butene and 1-hexene. The comonomer content in the ethylene copolymer (D) is preferably within the range of 0.1 to 10 wt %, more preferably 0.5 to 5 wt % of the total amount of polyethylene (D).

The polyethylene (D) may be produced by any process optionally in the presence of any catalyst suitable for producing polyethylene. It is preferred that polyethylene (D) is produced in a multistage polymerisation process such as bulk polymerisation, slurry polymerisation, solution polymerisation or combinations thereof using conventional catalysts. Polyethylene (D) can be made either in loop reactors or in a combination of loop and gas phase reactor. Those processes are well known to one skilled in the art.

Usually, a polyethylene composition comprising at least two polyethylene fractions, which have been produced under different polymerisation conditions resulting in different (weight average) molecular weights for the fractions, is referred to as "multimodal". The prefix "multi" relates to the number of different polymer fractions of the composition consisting of. Thus, for example, a composition consisting of two fractions only is called "bimodal".

The form of the molecular weight distribution curve, i.e. the appearance of the graph of the polymer weight fraction as function of its molecular weight, of such a multimodal polyethylene will show two or more maxima or at least be distinctly broadened in comparison with the curves for the individual fractions.

Preferably ethylene homo- or copolymer (D) is a multimodal, more preferably a bimodal ethylene homo- or copolymer.

A suitable catalyst for the polymerisation of the ethylene homo- or copolymer (D) is any stereospecific catalyst for ethylene polymerisation which is capable of polymerising and/or copolymerising ethylene and optionally comonomers at a temperature of 40 to 110° C. and at a pressure from 10 to 100 bar. Ziegler-Natta catalysts as well as metallocene catalysts are suitable catalysts.

Preferably, in the composition of the invention the amount of polyethylene (A) comprising polar groups is less than 50 wt % of the total composition, more preferably from 10 to 40 wt %, most preferably from 15 to 35 wt % of the total composition.

The polyethylene with polar copolymer preferably is produced by copolymerisation of ethylene monomers with polar comonomers. However, it may also be produced by grafting a polyethylene, for example by grafing acrylic acid, methacrylic acid or maleic anhydride onto the polyethylene.

It is preferred that the polar groups are introduced into the polyethylene by copolymerisation of ethylene monomers with appropriate comonomers bearing polar groups.

It is further preferred that the polar copolymer comprises a copolymer of ethylene, with one or more comonomer units selected from a group comprising, more preferably consisting of $C_1$- to $C_6$-alkyl acrylates, $C_1$- to $C_6$-alkyl methacrylates, acrylic acids, methacrylic acids and vinyl acetate. The copolymer may also contain ionomeric structures (like in e.g. DuPont's Surlyn types).

Still further preferred, the polar copolymer is an ethylene/acrylate, and/or ethylene/acetate, copolymer.

Further preferred, the polar polymer comprises a copolymer of ethylene with $C_1$- to $C_4$-alkyl, such as methyl, ethyl, propyl or butyl, acrylates or vinylacetate.

In a particularly preferred embodiment, component (A) of the polymer composition used for the flame retardant layer comprises, preferably makes up at least 25 wt %, more preferably at least 35 wt % and most preferably consists of, a copolymer or a mixture of copolymers of an olefin, preferably ethylene, with one or more comonomers selected from the group of non-substituted or substituted acrylic acids according to formula (I):

$$H_2C{=}CR{-}COOH \qquad (I)$$

wherein R is H or an organic substituent, preferably R is H or a hydrocarbon substituent.

More preferably, the type of comonomer is selected from the group of acrylic acid according to formula (I) wherein R is H or an alkyl group, still more preferably R is H or a $C_1$- to $C_6$-alkyl substituent.

It is particularly preferred that the polar polyethylene comprises a copolymer of ethylene with an acrylic copolymer, such as ethylene acrylic acid or methacrylic acid copolymer, and most preferred is ethylene methacrylic acid copolymer.

Preferably, the amount of comonomer with polar groups in the ethylene copolymer is from 2 to 40 wt %, more preferably is from 4 to 20 wt % and most preferably is from 6 to 18 wt %.

In addition to ethylene and the defined comonomers, the copolymers may also contain further monomers. For example, terpolymers between acrylates and acrylic acid or methacrylic acid, or acrylates with vinyl silanes, or acrylates with siloxane, or acrylic acid with siloxane may be used.

These copolymers may be crosslinked after extrusion, e.g. by irradiation. Silane-crosslinkable polymers may also be used, i.e. polymers prepared using unsaturated silane monomers having hydrolysable groups capable of crosslinking by hydrolysis and condensation to form silanol groups in the presence of water and, optionally, a silanol condensation catalyst.

It is further preferred that the polyethylene with polar groups makes up at least 30 wt. %, more preferred at least 50 wt. %, and still more preferred at least 70 wt. % of component (A). Most preferably, component (A) completely consists of the polyethylene with polar groups.

The composition further comprises a silicone-group containing compound (B).

In a preferred embodiment of the inventive composition, component (B) is a silicone fluid or a gum, or an olefin, preferably ethylene, copolymer comprising at least one silicone-group containing comonomer, or a mixture of any of these compounds.

Preferably, said comonomer is a vinylpolysiloxane, as e.g. a vinyl unsaturated polybishydrocarbylsiloxane.

Silicone fluids and gums suitable for use in the present inventions are known and include for example organopolysiloxane polymers comprising chemically combined siloxy units selected from the group consisting of $R_3SiO_{0.5}$, $R_2SiO$, $R^1SiO_{1.5}$, $R^1R_2SiO_{0.5}$, $RR^1SiO$, $R^1{}_2SiO$, $RSiO_{1.5}$ and $SiO_2$ units and mixtures thereof in which each R represents independently a saturated or unsaturated monovalent hydrocarbon radical and each $R^1$ represents a radical such as R or a radical selected from the group consisting of hydrogen, hydroxyl, alkoxy, aryl, vinyl or allyl radicals.

The organopolysiloxane preferably has a number average molecular weight $M_n$ of approximately 10 to 10,000,000. The molecular weight distribution (MWD) measurements were performed using GPC. $CHCl_3$ was used as a solvent. Shodex-Mikrostyragel ($10^5$, $10^4$, $10^3$, 100 Å) column set, RI-detector and a NMWD polystyrene calibration were used. The GPC tests were performed at room temperature.

The silicone fluid or gum can contain fumed silica fillers of the type commonly used to stiffen silicone rubbers, e.g. up to 50% by weight.

Copolymers of an olefin, preferably ethylene, and at least one silicone-group containing comonomer preferably are a vinyl unsaturated polybis-hydrocarbylsiloxane or an acrylate or methacrylate modified hydrocarbyl siloxane according to formula (II) and (III):

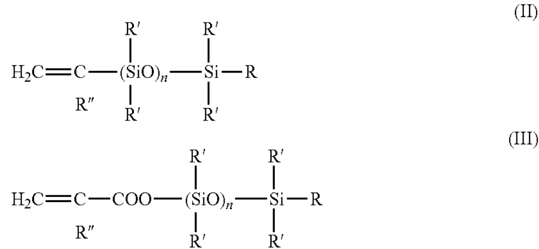

wherein in both (II) and (III) n=1 to 1000 and

R and R' independently are vinyl, alkyl branched or unbranched, with 1 to 10 carbon atoms; aryl with 6 or 10 carbon atoms; alkyl aryl with 7 to 10 carbon atoms; or aryl alkyl with 7 to 10 carbon atoms. R" is hydrogen or an alkyl chain.

Such compounds e.g. are disclosed in WO 98/12253 the contents of which is herein enclosed by reference.

Preferably, component (B) is polydimethylsiloxane, preferably having a $M_n$ of approximately 1,000 to 1,000,000, more preferably of 200,000 to 400,000, and/or a copolymer of ethylene and vinyl polydimethylsiloxane. These components (B) are preferred due to commercial availability.

The term "copolymer" as used herein is meant to include copolymers produced by copolymerization or by grafting of monomers onto a polymer backbone.

It is preferred that silicone-group containing compound (B) is present in the composition in an amount of 1 to 20 wt %, more preferred 2 to 15 wt %, and most preferred from 3 to 10 wt % of the total composition.

It is, furthermore, preferred that the silicone-group containing compound is added in such an amount that the amount of silicone-groups in the total composition is from 1 to 20 wt %, more preferably from 1 to 10 wt %.

It is preferred that inorganic filler (C) is present in the composition in an amount of more than 20 wt %, more preferred of 22 wt % or more, and most preferred of 25 wt % or more.

It is further preferred that inorganic filler (C) is present in the composition in an amount up to 60 wt %, more preferably of up to 50 wt % and most preferably of up to 45 wt %.

Component (C), i.e. the inorganic filler material suitable for use in the composition, comprises all filler materials as known in the art. Component (C) may also comprise a mixture of any such filler materials. Examples for such filler materials are carbonates, oxides and/or sulphates of an element of groups 1 to 13, more preferred groups 1 to 3, still more preferred groups 1 and 2 and even more preferred group 2, of the Periodic Table of Elements, most preferred of aluminium, magnesium, calcium and/or barium.

The numbering of chemical groups, as used herein, is in accordance with the IUPAC system in which the groups of the periodic system of the elements are numbered from 1 to 18.

Preferably, inorganic filler component (C) comprises, more preferably consists of, a compound which is neither a hydroxide, nor a hydrated compound, still more preferably comprises, more preferably consists of, a compound selected from carbonates, oxides and sulphates, and most preferably comprises, more preferably consists of, a carbonate.

Preferred examples of such compounds are calcium carbonate, magnesium oxide and huntite $Mg_3Ca(CO_3)_4$, with a particular preferred example being calcium carbonate.

Although inorganic filler (C) preferably is not a hydroxide or hydrated compound, it may contain small amounts of hydroxide typically less than 5% by weight of the filler, preferably less than 3% by weight. For example there may be small amounts of magnesium hydroxide in magnesium oxide. Furthermore, although filler (C) is not a hydrated compound, it may contain small amounts of water, usually less than 3% by weight of the filler, preferably less than 1% by weight. However, it is most preferred that component (C) is completely free of hydroxide and/or water.

Preferably, component (C) of the inventive flame retardant polymer composition comprises 50 wt % or more of calcium carbonate and further preferred consists of calcium carbonate.

In a preferred embodiment, the inorganic filler material (C) has an average particle size ($d_{50}$) of less than 5 μm, more preferably less than 3 μm, most preferably less than 2 μm.

The inorganic filler may comprise a filler which has been surface-treated with an organosilane, a polymer, a carboxylic acid or salt etc. to aid processing and provide better dispersion of the filler in the organic polymer. Such coatings usually do not make up more than 3 wt % of the filler.

Preferably, the compositions according to the present invention contain less than 3 wt % of organo-metallic salt or polymer coatings.

Furthermore, also other mineral fillers such as glass fibres may be part of the composition. Even further also nanofillers may be part of the compostions. Nanofillers are the defined as fillers with at least one of three dimensions in the nanoscale range.

The compositions according to the present invention may be cross-linkable. It is well known to cross-link thermoplastic polymer compositions using irradiation or cross-linking agents such as organic peroxides and thus the compositions according to the present invention may contain a cross-linking agent in a conventional amount. Silane cross-linkable polymers may contain a silanol condensation catalyst.

In addition to components (A) to (D) the composition of the invention may also contain additional conventional polymer ingredients such as, for example, antioxidants or UV stabilizers or carbon black in small amounts, usually below 10 wt %, more preferably below 5 wt %.

In one preferred embodiment the flame retardant polymer composition comprises carbon black in an amount below 10 wt %, more preferably below 5 wt %. In this embodiment no additional UV stabilizer is needed.

The upper limit of carbon black in this embodiment is preferably 0.5 wt %, more preferably 1 wt %, most preferably 1.5 wt % of the polymer composition.

In another preferred embodiment the flame retardant polymer composition does not comprise carbon black. In this embodiment UV stabilizer is added to the polymer composition in an amount of not more than 5 wt %, more preferably not more than 2 wt %.

The flame retardant polymer composition of the invention may be prepared by a) preparation of a master batch comprising the silicone-group containing compound, additives and polymer followed by compounding with inorganic filler and matrix polymer or b) one step compounding of all components.

For mixing, a conventional compounding or blending apparatus, e.g. a Banbury mixer, a continuous mixer, a 2-roll rubber mill, Buss-co-kneader or a twin screw extruder may be used.

Preferably, the composition will be prepared by blending them together at a temperature which is sufficiently high to soften and plasticise the polymer, typically a temperature in the range of 120 to 200° C.

The flame retardant polymer compositions of the invention show a good flame retardancy, in particular in the single wire burning test according to IEC 332-1. The purpose of the test method IEC 332-1 is to determine the resistance to flame propagation for single vertical cables. The cable (600 mm) is installed in a vertical position and a 1 kW flame produced by a propane burner is applied onto the cable sample at a 45° angle 475 mm from the upper support of the cable. The distance between the lower and upper support should be 550 mm. For cables having an outer diameter of less than 25 mm the flame is applied for 60 seconds. In order to fulfil the test, the flame should extinguish after the propane burner flame has been taken away and no charring should be visible within 50 mm from the upper support and below 540 mm. Preferably, the compositions of the invention pass the single wire burning test according to IEC 332-1.

At the same time, the compositions of the invention show good mechanical properties.

It is preferred that the flame retardant polymer composition has a tear strength of at least 10 N/mm, most preferably at least 11 N/mm with an upper limit of 100 N/mm, determined according to BS6469.

Further, the flame retardant polymer composition preferably has a tensile strength of at least 9 MPa, more preferably of at least 10 MPa, most preferably at least 11 MPa with an upper limit of 100 MPa and an elongation at break preferably of at least 400%, more preferably of at least 425%, most preferably of at least 450% with an upper limit of 1000%, both determined according to ISO 527-2.

Additionally, the flame retardant polymer composition preferably has a heat indentation of not more than 14.0%, more preferably not more than 13.5%, most preferably not more than 13% with a lower limit of 0%, determined in the high temperature pressure test for 6 h at a temperature of 105° C. according to IEC 60811-3-1.

The flame retardant compositions of the invention can be used in many and diverse applications and products. The compositions can for example be moulded, extruded or otherwise formed into mouldings, sheets and fibers.

The present invention thus further relates to an article comprising the flame retardant polymer composition in any of the above-described embodiments.

In particular, the invention relates to a wire or cable comprising a layer made of the flame retardant composition in any of the above-described embodiments and, accordingly, to the use of a flame retardant polymer composition in any of the above-described embodiments for the production of a layer of a wire or cable. In an especially preferred embodiment the cable of the invention refers to a low voltage cable which apart from a conducting core and optionally a skin layer and/or a bedding layer only comprise one polymer layer. This layer accordingly must fulfill several functions at the same time, which e.g. in medium and high voltage cables are fulfilled by separate layers. These functions comprise those of an insulation layer and an outer, protecting jacket.

In another preferred embodiment the cable of the invention refers to a medium or high voltage cable. In electric power cables, in particular for medium voltage (6 kV to 36 kV) and high voltage (>36 kV), usually a metal conductor is surrounded by an inner semiconductive layer, an insulation layer, an outer semiconductive layer and auxiliary further layer(s) and a cable jacket. It is preferred that at least one of the layers of the medium or high voltage cable comprises the inventive flame retardant polymer composition.

In a preferred embodiment the flame retardant layer preferably has a thickness of 0.1 to 15 mm. Further in this embodiment the wire preferably has an outer skin layer with a maximum thickness of 0.4 mm. Preferably the outer skin layer is made of a halogen-free polyolefin based polymer composition. Still further in this embodiment, in the wire the conductor area is from 0.1 to 400 $mm^2$.

In a further embodiment the cable or wire preferably is produced in a continuous process and has a length of at least 100 m, more preferably at least 500 m and most preferably 1000 m. Furthermore in this embodiment the thickness of the flame retardant polymer layer in the wire is from 0.1 to 50 mm. Further preferred, the thickness of the insulating layer is from 0.3 to 15 mm. Still further in this embodiment, the area of the inner core consisting of the electrical conductors preferably is from 0.3 to 400 $mm^2$ diameter.

The polymer composition preferably is extruded to form a flame retardant layer of a wire or cable.

The pressure used for extrusion preferably is 50 to 500 bar.

Still further, the invention relates to the use of an ethylene homo- or copolymer in the production of a flame retardant layer for a wire or cable for improving the mechanical properties of the wire or cable wherein the polymer composition of the flame retardant layer has a melting enthalpy of at least 78 J/g, more preferably at least 80 J/g, most preferably at least 82 J/g. Thereby, the ethylene homo- or copolymer is preferably present in an amount of 10 to 50 wt % of the flame retardant layer.

In the following the present invention is further illustrated by means of examples.

EXAMPLES

1. Measurement Methods a) Melt Flow Rate

The melt flow rate (MFR) was measured in accordance with ISO 1133 and is indicated in g/10 min. The MFR is an indication of the flowability, and hence the processability, of the polymer. The higher the melt flow rate the lower the viscosity of the polymer. The $MFR_2$ of polyethylene is determined at 190° C. and a load of 2.16 kg, the $MFR_5$ of polyethylene is determined at 190° C. and a load of 5 kg and the $MFR_{21}$ of polyethylene is determined at 190° C. and a load of 21.6 kg. The $MFR_2$ of polypropylene is determined at 230° C. and a load of 2.16 kg.

b) Density

The density was measured according to ISO 1183 on compression moulded specimens.

c) Tensile Properties

The tensile properties are determined according to ISO 527-2. Dumb-bell test pieces were prepared according to ISO 527-2, Type 5A, from 2.0 mm thick compression moulded plaques.

For the preparation of the compression moulded plaques, the compounds described in section 2 below were firstly extruded into thin tapes using a Brabender Plasti-corder extruder with a film nozzle. The tape had a thickness of 1.5 mm. The temperature profile used was 160/170/180° C. (Ex.1-2 & CE.1) and 180/190/200° C. (CE.2). The extruder speed was 50 rpm.

The extruded tapes were used as material for the compression moulding of plaques of the materials described in section 2. The tapes were stacked in a frame. The thickness of the plaque depended on the consecutive test to be executed (tear strength and pressure test: 1 mm; tensile properties: 2 mm). The compounds (tapes) were pressed into plaques in a Collin press at 200 bar at a temperature of 170° C. (except CE2 which was pressed at a temperature of 180° C.) during five minutes. Cooling rate was 15° C./minute under high pressure.

The direction of the test pieces was parallel to the original orientation of the extruded tapes. The elongation at break and tensile strength was conducted at 23° C. temperature with an elongation rate of 50 mm/min.

d) Tear Strength

The tear strength is determined according to BS 6469. The test samples were based on compression moulded plaques as prepared above under c) with a thickness of 1.0 mm. The sample was punched from the plaques using a standardised punch according to BS 6469. The test equipment used is Alwetron TCT25. The testing speed was 500 mm/min. At least 6 samples of each compositions were tested to provide a reliable mean value.

e) Pressure Test

The pressure test was conducted according to IEC 60811-3-1 at a temperature of 105° C. for 6 h. A 3 mm wire was positioned under the compression moulded plaques as prepared above under c).

f) Production of Cables 0.7±0.1 mm insulation layer was extruded onto 1.5 $mm^2$ copper conductor on a Francis Shaw 60 mm/24D wire line. Three cores were twisted together by the use of a Northampton Twister. The bedding (Extruder: Maillefer 45 mm/30 D) and sheathed (Extruder Mapre 60 mm/24D) layers were applied by a tandem extrusion process. In order to avoid adhesion between the bedding and its surrounding layers talcum were "powdered" onto the cores and bedding layer just prior the bedding and sheath layer were applied.

As insulation a commercial compound intended for wire & cable applications and all produced by Borealis Technology Oy was used.

LE4423 is an insulation for cable applications which is a silane-crosslinkable polyethylene according to Borealis' Visico® technology which has a MFR2.16, 190° C. of 1.0 g/10 min and a density of 923 kg/m3.

As bedding compound a commercial compound from Melos GmbH was used: FM1438.

The sheathing layers used are the respective ones mentioned in Table 1.

g) Single Wire Burning Test

The single wire burning test was done in full accordance with IEC 332-1. In order to fulfil the test the flame should extinguish after the flame from the 1 kW propane burner has been taken away and no charring should be visible within 50 mm from the upper support and below 540 mm. A wire fulfilling this criterium was marked "pass" in Table 1, otherwise it was marked "fail".

h) Melting Temperature and Melting Enthalpy

The melting temperature ($T_m$) was measured with differential scanning calorimetry (DSC) in a TA Instruments DSC Q2000 differential scanning calorimeter on 3±0.5 mg samples. The melting curves were obtained during 10° C./min cooling and heating scans according to ISO 3146/part 3/method C2 between −30° C. to 180° C. The melting temperature was taken as the peaks of endotherms and exotherms, respectively.

The melting enthalpy was determined during the second melting at a temperature range between −20° C. to 140° C. The baseline for the determination of the melting enthalpy was constructed according to ASTM D3418. The temperature interval used for the melting enthalpy calculation is based on the rejoining of the DSC measuring signal with constructed baseline. The expression "second melting" means that the sample is heated according to ISO 3146/part 3/method C2 for the first time and is then cooled to room temperature at a rate of 20° C./min. The sample is then heated a second time again according to ISO 3146/part 3/method C2. This second melting is relevant for measurement of the melting enthalpy. During the first melting all thermal history of the sample giving rise to different crystalline structures, which typically results from different processing conditions and/or methods of the samples, is destroyed. Thus, by using the second melting for determination of the melting enthalpy it is possible to compare the enthalpy of samples regardless of the way the samples were originally manufactured.

2. Compositions

The flame retardant polymer compositions were produced by compounding together the compounds on a Farrel continuous mixer (Type 9FCM) dropping into a 12 inch pelleting extruder.

The following compositions were prepared:

Inventive Composition 1 (Ex 1):

- 25.1 wt % ethylene butylacrylate (EBA) copolymer with a content of butyl acrylate comonomers of 8.0 wt %, $MFR_2$=0.5 g/10 min (EBA1)
- 7.0 wt % silicone masterbatch with 40 wt % of polysiloxane in polyethylene
- 35.0 wt % $CaCO_3$ (Omya EXH 1 SP) with a particle size $d_{50}$ of 1.4 μm, distributed by Omya
- 26.0 wt % of a bimodal ethylene copolymer having a 1-butene comonomer content of 2.4 wt % with a density of 946 $kg/m^3$, a $MFR_2$ of 0.55 g/10 min, a $MFR_{21}$ of 40 g/10 min (PE1)
- 6.7 wt % of a carbon black masterbatch; with 39 wt % carbon black in ethylene butylacrylate (EBA) copolymer with a content of butyl acrylate comonomers of 17.0 wt %; and a $MFR_{21}$ of 21 g/10 min (PE4)
- 0.2 wt % Irganox 1010, distributed by Ciba Specialty Chemicals Inventive Composition 2 (Ex 2)

- 20.0 wt % ethylene butylacrylate (EBA) copolymer with a content of butyl acrylate comonomers of 13.0 wt %, $MFR_2$=0.4 g/10 min (EBA2)
- 7.0 wt % silicone masterbatch with 40 wt % of polysiloxane in polyethylene
- 30.0 wt % $CaCO_3$ (Omya EXH 1 SP) with a particle size $d_{50}$ of 1.4 μm, distributed by Omya
- 17.8 wt % of a bimodal ethylene copolymer having a 1-butene comonomer content of 2.4 wt % with a density of 946 $kg/m^3$, a $MFR_2$ of 0.55 g/10 min, a $MFR_{21}$ of 40 g/10 min (PE1)
- 20.0 wt % of a bimodal ethylene copolymer having a 1-butene comonomer content of 3.2 wt % with a density of 954 $kg/m^3$, a $MFR_2$ of 1.7 g/10 min, a $MFR_5$ of 6.15 g/10 min, containing carbon black in an amount of 2.6 wt % (PE2)

5.0 wt % of a carbon black masterbatch with 39 wt % carbon black in ethylene butylacrylate (EBA) copolymer with a content of butyl acrylate comonomers of 17.0 wt %, and a $MFR_{21}$ of 21 g/10 min (PE4)

0.2 wt % Irganox 1010, distributed by Ciba Specialty Chemicals

Inventive Composition 3 (Ex 3)

24.87 wt % ethylene butylacrylate (EBA) copolymer with a content of butyl acrylate comonomers of 13.0 wt %, $MFR_2$=0.4 g/10 min (EBA2)

7.0 wt % silicone masterbatch with 40 wt % of polysiloxane in polyethylene 30.0 wt % $CaCO_3$ (Omya EXH 1 SP) with a particle size $d_{50}$ of 1.4 μm, distributed by Omya 37.68 wt % of a bimodal ethylene copolymer having a 1-butene comonomer content of 3.6 wt % with a density of 944 kg/m$^3$, a $MFR_2$ of 1.7 g/10 min, a $MFR_5$ of 6.0 g/10 min (PE3)

0.2 wt % Irganox 1010, distributed by Ciba Specialty Chemicals 0.25 wt % Tinuvin 783 FDL, distributed by Ciba Specialty Chemicals Comparative Composition 1 (CE 1)

61.3 wt % ethylene butylacrylate (EBA) copolymer with a content of butyl acrylate comonomers of 8.0 wt %, $MFR_2$=0.5 g/10 min (EBA1)

6.25 wt % silicone masterbatch with 40 wt % of polysiloxane in polyethylene 30.0 wt % $CaCO_3$ (Omya EXH 1 SP) with a particle size $d_{50}$ of 1.4 μm, distributed by Omya 2.0 wt % of a heterophasic propylene copolymer with 85 wt % propylene homopolymer as matrix and 15 wt % of ethylene propylene rubber, of which 7 wt % are ethylene units, as dispersed phase, $MFR_2$=1.3 g/10 min (PP)

0.2 wt % Irganox 1010, distributed by Ciba Specialty Chemicals 0.25 wt % Tinuvin 783 FDL, distributed by Ciba Specialty Chemicals Comparative Composition 2 (CE 2)

31.55 wt % ethylene butylacrylate (EBA) copolymer with a content of butyl acrylate comonomers of 8.0 wt %, $MFR_2$=0.5 g/10 min (EBA1)

7.0 wt % silicone masterbatch with 40 wt % of polysiloxane in polyethylene 35.0 wt % $CaCO_3$ (Omya EXH 1 SP) with a particle size $d_{50}$ of 1.4 μm, distributed by Omya 26.0 wt % of a heterophasic propylene copolymer with 85 wt % propylene homopolymer as matrix and 15 wt % of ethylene propylene rubber, of which 7 wt % are ethylene units, as dispersed phase, $MFR_2$=1.3 g/10 min (PP)

0.2 wt % Irganox 1010, distributed by Ciba Specialty Chemicals 0.25 wt % Tinuvin 783 FDL, distributed by Ciba Specialty Chemicals 3. Results In the following table 1 the melting temperature and the melting enthalpy of compositions Ex 1, Ex 2, Ex 3 and CE 1 are listed together with the total amount of polyethylene components PE1, PE2, PE3 and PE4 of the composition.

TABLE 1

Melting temperature and melting enthalpy

| | CE1 | Ex 1 | Ex 2 | Ex 3 |
|---|---|---|---|---|
| Amount of PE1-PE4 [wt %] | 0 | 26.0 | 37.8 | 37.68 |
| Melting Temperature [C.] | 102.0 | 125.4 | 126.1 | 126.4 |
| Melting Enthalpy of total polymer composition [J/g] | 76.3 | 91.1 | 121.7 | 106.9 |

It can be seen from table 1 that the addition of polyethylene components (PE1, PE2, PE3 and/or PE4) increases the melting temperature as well as the melting enthalpy of the polymer composition of the flame retardant compositions.

In the following table 2 the mechanical properties flame retardant properties of the compositions are listed. The mechanical properties were measured on plaques whilst the flame retardant properties were measured on cables.

TABLE 2

Mechanical and flame retardant properties:

| | CE 1 | CE 2 | Ex 1 | Ex 2 | Ex 3 |
|---|---|---|---|---|---|
| Tensile strength [MPa] | 12.0 | 12.6 | 12.1 | 14.0 | 13.9 |
| Elongation at break [%] | 575.4 | 478.9 | 461.0 | 555.6 | 631.4 |
| Tear strength [N/mm] | 11.4 | 7.5 | 11.2 | 13.7 | 14.7 |
| Pressure test [% indentation] | 100 | 14 | 13 | 8 | 10 |
| Single wire test | Pass | Pass | Pass | Pass | Pass |

From the results in table 2 it is clear that the addition of polyethylene to a flame retardant composition provides compounds which display a combination of excellent mechanical properties whilst maintaining the flame retardant character. The mechanical properties included are tensile properties, tear strength and heat indentation. The inventive examples clearly show a good performance on all properties (Ex 1-Ex 3). The comparative examples (CE 1-CE 2) never display a good performance for all these mechanical properties.

The invention claimed is:

1. A flame retardant polymer composition comprising (A) an ethylene copolymer comprising polar comonomer units, (B) a silicone-group containing compound, (C) an inorganic filler material, and (D) an ethylene homopolymer or a copolymer of ethylene with one or more other alpha-olefin comonomer units, wherein the inorganic filler material (C) is present in an amount of 20 to 45 wt % of the total composition, the ethylene homo- or copolymer (D) is present in an amount of 15 wt % or more of the total composition, and has a density of 940 to 960 kg/m$^3$, determined according to ISO 1183, and wherein the polymer composition has a melting enthalpy of at least 78 J/g.

2. Flame retardant polymer composition according to claim 1, wherein ethylene homo- or copolymer (D) has a MFR (2.16 kg, 190° C) of 0.1 to 15.0 g/10 min, determined according to ISO 1133.

3. Flame retardant polymer composition according to claim 1, wherein ethylene homo- or copolymer (D) is multimodal.

4. Flame retardant polymer composition according to claim 1, wherein the amount of ethylene copolymer (A) is less than 50 wt % of the total composition.

5. Flame retardant polymer composition according to claim 1, wherein the polar comonomer units of ethylene copolymer (A) are selected from a group comprising $C_1$-$C_6$ alkyl acrylates, $C_1$-$C_6$ alkyl methacrylates, acrylic acid, methacrylic acid and vinyl acetate, including ionomers thereof.

6. Flame retardant polymer composition according to claim 1, wherein component (B) is present in an amount of 1 to 20 wt % of the total composition.

7. Flame retardant polymer composition according to claim 1, wherein component (B) is a silicone fluid and/or gum, and/or a copolymer of ethylene and at least one comonomer which comprises a silicone group.

8. Flame retardant polymer composition according to claim 1, wherein inorganic filler material (C) is present in an amount of 22 to 45 wt % of the total composition.

9. Flame retardant polymer composition according to claim 1, wherein inorganic filler material (C) comprises a carbonate, oxide and/or sulphate of an element of groups 1 to 13 of the Periodic System of the Elements.

10. Flame retardant polymer composition according to claim 1, wherein the composition further comprises carbon black in an amount of 1 to 5 wt % of the total composition.

11. Flame retardant polymer composition according to claim 1, wherein the polymer composition has a tear strength of at least 10 N/mm determined according to BS 6469.

12. Flame retardant polymer composition according to claim 1, wherein the polymer composition has a tensile strength of at least 9 MPa, determined according to ISO 527-2.

13. Flame retardant polymer composition according to claim 1, wherein the polymer composition has a heat indentation of less than 14.0% in the pressure test according to IEC 60811-3-1.

14. An article comprising the flame retardant polymer composition according to claim 1.

15. Wire or cable comprising a layer made of the flame retardant polymer composition according to claim 1.

16. Method for producing a flame retardant layer for a wire or cable, comprising compounding:

(A) an ethylene copolymer comprising polar comonomer units, (B) a silicone-group containing compound, (C) an inorganic filler material, and (D) an ethylene homopolymer or a copolymer of ethylene with one or more other alpha-olefin comonomer units, to form a polymer composition, wherein the inorganic filler material (C) is present in an amount of 20 to 45 wt % of the total composition, the ethylene homo- or copolymer (D) is present in an amount of 15 wt % or more of the total composition, and has a density of 940 to 960 kg/m$^3$, determined according to ISO 1183, wherein the polymer composition of the flame retardant layer has a melting enthalpy of at least 78 J/g for improving the mechanical properties of the wire and cable.

* * * * *